United States Patent [19]

Cipolli et al.

[11] Patent Number: 5,321,057
[45] Date of Patent: Jun. 14, 1994

[54] AMMONIUM POLYPHOSPHATE MICROENCAPSULATED WITH AMINOPLASTIC RESINS

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero dell'Universita' e della Ricerca Scientifica e Tecnologica, Rome, Italy

[21] Appl. No.: 976,320

[22] Filed: Nov. 13, 1992

[30] Foreign Application Priority Data

Nov. 14, 1991 [IT] Italy .................. MI91 A 003041

[51] Int. Cl.$^5$ .............. C08K 5/34; C08K 3/32; C08L 23/00
[52] U.S. Cl. ................. 523/208; 524/100; 524/416; 252/609; 428/524
[58] Field of Search .......... 428/524; 524/100, 416; 523/179, 208; 252/609

[56] References Cited

U.S. PATENT DOCUMENTS

| | | | |
|---|---|---|---|
| 4,504,610 | 3/1985 | Fontanelli et al. | 524/96 |
| 4,727,102 | 2/1988 | Scarso | 524/100 |
| 5,096,961 | 3/1992 | Eberspach | 524/707 |
| 5,153,245 | 10/1992 | Cipolli et al. | 524/100 |

FOREIGN PATENT DOCUMENTS

| | | |
|---|---|---|
| 0014463 | 8/1980 | European Pat. Off. . |
| 0180795 | 5/1986 | European Pat. Off. . |
| 0406810 | 1/1991 | European Pat. Off. . |
| 1286661 | 8/1972 | United Kingdom . |

*Primary Examiner*—Kriellion S. Morgan
*Attorney, Agent, or Firm*—Oblon, Spivak, McClelland, Maier & Neustadt

[57] ABSTRACT

Ammonium polyphosphate having the general formula (I):

$$(NH_4)_{n+2}P_nO_{3n+1} \qquad (I)$$

microencapsulated with condensation compounds obtained by polymerizing polyaminic compositions essentially constituted by derivatives of 2,4,6-triamino-1,3,5-triazine having the general formula (II):

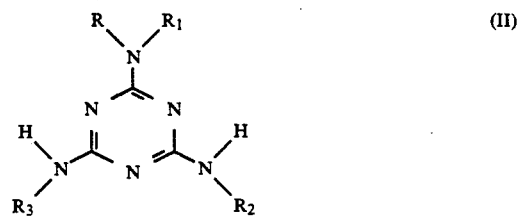

with aldehyde, preferably formaldehyde.

12 Claims, No Drawings

AMMONIUM POLYPHOSPHATE MICROENCAPSULATED WITH AMINOPLASTIC RESINS

The present invention relates to a composite constituted by ammonium polyphosphate microencapsulated with aminoplastic resins obtained by polymerizing polyaminic compositions, essentially constituted by malaminic derivatives, with aldehydes.

More particularly, the present invention relates to ammonium polyphosphate microencapsulated with aminoplastic resins obtained by polymerizing with aldehydes, preferably formaldehyde, derivatives of 2,4,6-triamino-1,3,5-triazine.

Said compounds are able to endow thermoplastic polymers, or polymers with elastomeric properties, in particular olefinic polymers or copolymers, with high characteristics of self-extinguishment in the presence of a flame.

In particular, the subject matter of the present invention is a composite constituted by ammonium polyphosphate having the general formula (I):

$$(NH_4)_{n+2}P_nO_{3n+1} \tag{I}$$

wherein n stands for an integer comprised within the range of from 2 to 800, preferably of from 5 to 500, microencapsulated with 10–80% by weight of a resin obtained by polymerizing with aldehydes a mixture comprising:

(a) from 0 to 50 parts by weight of one or more polyaminic derivatives;

(b) from 50 to 100 parts by weight of one or more derivatives of 2,4,6-triamino-1,3,5-triazine having the general formula (II):

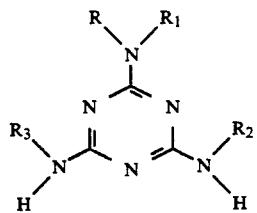

wherein at least one of radicals from R to $R_3$ is:

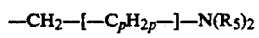

wherein:
m = an integer comprised within the range of from 1 to 7;
p = an integer comprises within the range of from 1 to 5;
$R_4$ = H; $C_1$–$C_8$ alkyl; $C_2$–$C_6$ alkenyl; —[—$C_qH_{2q+1}$—]—O—$R_6$ wherein q is an integer comprises within the range of from 1 to 4 and $R_6$ is H or $C_1$–$C_4$ alkyl; $C_6$–$C_{12}$ cycloalkyl or alkylcycloalkyl;
the radicals $R_5$, which may be the same or different from each other, are:
H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety;

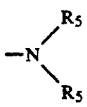

is replaced by a heterocyclic radical linked to the alkyl chain through the nitrogen atom, and possibly containing another heteroatom preferably selected from O, S, N;
or in the general formula (II) the moiety:

is replaced by a heterocyclic radical linked to the triazinic ring through the nitrogen atom, and possibly containing another heteroatom preferably selected from O, S, N;
the other radicals from R to $R_3$, which may be the same or different from one another, have the above said meaning, or they are:
H, $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function.

According to a preferred form of practical embodiment of the composite according to the present invention, the polyaminic derivative is selected from compounds containing the 1,3,5-triazine ring, or at least one moiety >C=O and/or >C=S.

The (a) and (b) components shall be selected in such a way as to secure a high level of crosslinking with the aldehdyes, in order to maximize the microencapsulation of ammonium polyphosphate and consequently reduce its water solubility down to very low values.

Preferably, the aldehyde is formaldehyde or a mixture containing formaldehyde and, up to 20% by mol, another aldehdye with general formula (III):

$$R_7-CHO \tag{III}$$

wherein $R_7$ is $C_1$–$C_8$ alkyl; $C_2$–$C_6$ alkenyl, $C_6$–$C_{12}$ cycloalkyl; $C_6$–$C_{12}$ aryl.

However, formaldehyde is the preferred aldehyde.

Examples of ammonium polyphosphate of general formula (I) are:

ammonium pyrophosphate, ammonium tripolyphosphate, commercial ammonium polyphosphate, such as, for example, those known under the mark "Exolit 422" (manufactured and marketed by Hoechst) and under the mark "Phos-Chek P/40" (Monsanto Chemical).

Examples of radicals from R to $R_3$ in general formula (II) are:

methyl, ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl;

3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylemino)ethyl; 3-(N,N-dimethylamino)propyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 5-(N,N-diethylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)ethyl; 2-(N-ethenylamino)ethyl; 2-(N-cyclohexylamino)ethyl; 2-(2-methoxyethoxy)ethyl; 6-(N-propylamino)hexyl; and so forth.

Examples of heterocyclic radicals which may replace the moiety:

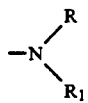

in general formula (II) are:
aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

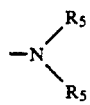

are:
aziridine; pyrrolidine; piperidine; morpholine; thiomorpholine; piperazine; 4-methylpiperazine; 4-ethylpiperazine; and so forth.

Examples of polyaminic derivatives are: urea; ethyleneurea; melamine; acetoguanamine; propionguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

By "formaldehyde", as this term is used in the instant disclosure and in the appended claims, any forms are meant, in which formaldehdye is usually marketed: aqueous solution, metaformaldehyde, paraformaaldhyde.

Examples of radicals $R_7$ are: methyl; ethyl; n-propyl; n-butyl; n-hexyl; n-octyl; ethenyl; propenyl; cyclohexyl; phenyl; and so forth.

The composites according to the present invention can be synthesized as follows:

(i) by reacting in solution, with a suitable solvent (such as, e.g., methyl alcohol, ethyl alcohol, water or their mixtures, and so forth), the derivative of 2,4,6-triamino-1,3,5-triazine having the general formula (II), either mixed or not mixed with the polyaminic derivative, with aldehydes. The molar ratio of the triazinic derivative of general formula (II), or of its mixture with the polyaminic derivatives, to the aldehydes, is comprises within the range of from 1:1 to 1:6.

The reaction is carried out at a pH value comprises within the range of from 7 to 12, possibly obtained by adding an alkali (such as, for example, potassium carbonate, sodium carbonate, sodium hydroxide, and so forth), at temperatures comprises within the range of from 20° C. to solvent boiling point, until a solution is obtained;

(ii) causing the resulting reaction product to turn into a resin by feeding it to a dispersion of ammonium polyphosphate having the general formula (I), in finely subdivided form, with particle size smaller than 70 micrometers, in a liquid of the above mentioned type, having a pH value comprised within the range of from 1 to 5, and heated at a temperature of from 40° C. to 150° C. pH values comprised within the range of from 1 to 5 can be obtained by possibly adding an acid (such as, e.g., sulfuric acid, hydrochloric acid, phosphoric acid, and so forth) to said dispersion. The resulting mixture is kept further stirred at the selected temperature, during the necessary time to complete the polymerizing and microencapsulation process, preferably of from 1 to 12 hours. The resulting product, constituted by microencapsulated ammonium polyphosphate, is filtered off.

The composite is first dried at 100° C., then is submitted to thermal treatment for some hours, preferably from 1 to 3 hours, in a vacuum oven at 150° C.

Generally, a good quality composite is obtained as a white crystalline powder, with a distribution of particle size substantially identical to the particle size distribution of ammonium polypohosphate used. Possibly present aggomerates of material are easily broken without causing the particle coating to be fractured.

The composite according to the present invention can be used in self-extinguishing polymeric compositions without any further treatments.

The effectiveness of ammonium polyphosphate microencapsulation is evaluated by measuring the solubility of the obtained composite in water at 60° C., according to a process disclosed in the following.

An alternative synthesis route consists in causing the reactions of steps (i) and (ii) to take place as one single step, at a pH value comprises within the range of from 1 to 5, and at a higher temperature than 40° C.

Many of derivatives of 2,4,6-triamino-1,3,5-triazine with general formula (II) are known; they can anyway be easily synthesized according to as disclosed in European Patent application publication No. 406,810, to the same applicant's name.

Composites constituted by ammonium polyphosphate with general formula (I) microensapsulated with 10-80% by weight of a resin obtained by means of the polymerization of triazinic derivatives of general formula (II), either containing or not containing the polyaminic derivatives, with formaldehyde only, not mentioned in the examples, are those as reported in Table 1.

TABLE 1

| COMPOUND No | Derivative with general formula (I) R—N—R$_1$ | | R$_2$ | R$_3$ | Parts by weight | Polyaminic Derivative Designation | Parts by weight | Molar ratio amines/formaldehyde | Ratio by weight APP/resin |
|---|---|---|---|---|---|---|---|---|---|
| 1 | (CH$_2$)$_3$OH | H | H | H | 85 | Acetoguanamine | 15 | 1:8.0 | 3.2:1 |
| 2 | (CH$_2$)$_2$OCH$_3$ | (CH$_2$)$_2$OCH$_3$ | H | H | 58 | Melamine | 42 | 1:5.0 | 1.6:1 |
| 3 | (CH$_2$)$_3$OCH$_3$ | H | H | H | 100 | — | | 1:6.0 | 3.2:1 |
| 4 | N-piperidinyl | | H | H | 66 | Melamine | 34 | 1:5.0 | 3.0:1 |
| 5 | CH$_2$CH$_2$OH | H | H | H | 90 | Benzoguanamine | 10 | 1:3.5 | 3.5:1 |
| 6 | (CH$_2$)$_5$OH | H | H | H | 100 | — | | 1:6.0 | 2.8:1 |
| 7 | N-thiomorpholinyl | | H | H | 60 | Melamine | 40 | 1:5.0 | 1.4:1 |
| 8 | CH$_2$CH$_2$OCH$_3$ | H | H | H | 87 | Benzoguanamine | 13 | 1:4.5 | 2.8:1 |
| 9 | (CH$_2$)$_2$O(CH$_2$)$_2$OH | H | H | H | 100 | — | | 1:3.5 | 2.6:1 |
| 10 | N-pyrrolidinyl | | H | H | 55 | Melamine | 45 | 1:4.5 | 2.9:1 |
| 11 | CH$_2$CH$_2$OH | CH$_3$ | H | H | 63 | Melamine | 37 | 1:3.6 | 2.3:1 |
| 12 | (CH$_2$)$_3$N(C$_2$H$_5$)$_2$ | H | H | H | 100 | — | | 1:5.0 | 3.1:1 |
| 13 | N-piperazinyl (N—H) | | H | H | 75 | Melamine | 25 | 1:3.2 | 1.7:1 |
| 14 | CH$_2$CH$_2$OH | H | CH$_2$CH$_2$OH | H | 88 | Succinoguanamine | 12 | 1:4.0 | 2.6:1 |
| 15 | CH$_2$CH$_2$OCH$_3$ | H | CH$_2$CH$_2$OCH$_3$ | CH$_2$CH$_2$OCH$_3$ | 100 | — | | 1:2.5 | 1.5:1 |
| 16 | N-morpholinyl | | CH$_2$CH=CH$_2$ | H | 100 | Melamine | 35 | 1:3.2 | 4.0:1 |
| 17 | (CH$_2$)$_3$OC$_2$H$_5$ | H | H | H | 86 | Propyleneurea | 14 | 1:2.8 | 4.0:1 |
| 18 | N-morpholinyl | | t-C$_4$H$_9$ | H | 70 | Melamine | 30 | 1:3.0 | 2.8:1 |
| 19 | CH$_2$CH$_2$OCH$_3$ | H | C$_2$H$_5$ | C$_2$H$_5$ | 100 | — | | 1:2.4 | 3.2:1 |
| 20 | N-morpholinyl | | CH$_2$CH$_2$OCH$_3$ | H | 66 | Melamine | 34 | 1:2.8 | 2.9:1 |
| 21 | CH$_2$CH$_2$OH | H | CH$_2$CH$_2$OH | CH$_2$CH$_2$OH | 80 | Melamine | 20 | 1:2.5 | 3.0:1 |
| 22 | CH$_2$CH$_2$OH | N-piperidinyl | H | H | 62 | Melamine | 38 | 1:3.0 | 2.6:1 |

APP = Exolit$^{(R)}$ ammonium polyphosphate (ex Hoechst)

The examples disclosed in the following illustrate the features of the invention without limiting it.

As mentioned hereinabove, the effectiveness of the process for ammonium polyphosphate microencapsulation is evaluated by measuring the solubility in water at 60° C. of the resulting product, according to the following process.

A number of grammes of composite according to the present invention are weighed, which are equal to:

$$\frac{10}{APP\%} \times 100$$

wherein:
APP % is the value of the percent content, by weight, of ammonium polyphosphate contained in the composite obtained in the examples disclosed in the following (an determined by means of elemental analysis for phosphorus content), and are charged, together with 100 cm$^3$ of distilled water, to a reactor of 0.25 liters equipped with stirrer, thermometer, reflux condenser and heating bath. The dispersion is heated at 60° C., and is kept at that temperature value for 20 minutes, then the dispersion is centrifuged for 45 minutes.

Subsequently, 5 cm$^3$ of clear liquid phase is drawn and is dried in oven at 120 C.

The solubility of ammonium polyphosphate, expressed as g/100 g of water, is calculated from the weight of the residue (APP).

A further consideration of the encapsulation degree achieved is obtained by analysing the obtained products by scanning electron microscopy, with a CAMBRIDGE STEREOSCAN 200 model SEM, which makes it possible, besides crystal size, the type and amount to be evaluated of resin coating deposited on ammonium polyphosphate crystals.

EXAMPLE 1

184.5 g of cyanuric chloride and 800 cm³ of acetone are charged to a reactor of 3 liters of capacity, equipped with stirrer, thermometer, dripping funnel, reflux condenser and heating bath.

With stirring, the reaction mixture is heated up to 40° C. in order to obtain a solution, then 284 g of an aqueous solution of ammonia at 30% by weight are added during a 1 hour and 30 minutes time. The reaction mixture is subsequently heated up to 45° C. and is kept 4 hours at this temperature.

After cooling, the resulting product is filtered off and is washed on the filter with water.

After oven drying at 50°–60° C. under vacuum, 113 g of intermediate (IV):

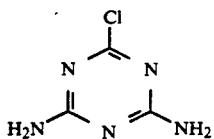
(IV)

are obtained as a white, infusible, crystalline powder containing 24.12% of chlorine (theoretical chlorine content=24.35%).

101.9 g of intermediate (IV), 500 cm³ of water and then, with stirring, 44.8 g of 2-hydroxyethylamine are charged to a reaction vessel of 1 liter of capacity equipped with stirrer, thermometer, addition funnel, reflux condenser and heating bath.

The reaction mixture is heated up to boiling temperature and then is kept refluxing for 4 hours.

The reaction mixture is then caused to reflux for a further 8 hours, with 28 g of sodium hydroxide in 100 cm³ of water being added portionwise, so as to keep pH value comprised within the range of from 7 to 8.

The reaction mixture is cooled down to 15° C., the resulting product is filtered off, and the filter cake is washed on the same filter with cold water.

By drying the filter cake in an oven at 100° C., 107.5 g of 2-(2-hydroxyethyl)amino-4,6-diamino-1,3,5-triazine (V):

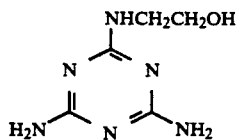
(V)

are obtained as a white crystalline powder with m.p.=225° C.-230° C. (m.p.=melting point).

The structure of intermediates (IV) and (V) was furthermore confirmed by IR spectroscopic analysis.

45 cm³ of methanol, 51.1 g of an aqueous solution at 37% by weight of formaldehyde and, with stirring, 30.6 g of intermediate (V) are charged to a reactor of 0.25 liters of capacity, equipped as the preceding one.

The reaction mass is heated at 70° C. for 30 minutes, until a solution is obtained.

The resulting solution, kept at 70° C., is fed, during a 30 minute time, to the same liter reactor as disclosed hereinabove, containing a suspension consisting of 90 g of ammonium polyphosphate [Exolit(®) 422, with a phosphorus content of 31.4%], 200 cm³ of methanol and 200 cm³ of water, heated at 65° C.

The resulting mixture is heated to boiling temperature and is kept refluxing for 7 hours.

The reaction mixture is allowed to cool down to room temperature, and the resulting product is filtered off, with the filter cake being washed with a water-methanol mixture.

By drying the filter cake in an oven at 100° C., and subsequently submitting it to a heat treatment at 150° C. for 2 hours under vacuum, 116 g of a white crystalline product are obtained, which contains 23.4% of phosphorus, corresponding to a content of 74.5% by weight of ammonium polyphosphate.

The obtained product corresponds hence to ammonium polyphosphate microencapsulated with resin in a ratio of 2.92:1 by weight.

The solubility of thus encapsulated ammonium polyphosphate in water at 60° C. is of 6.3% by weight.

The solubility of Exolit(®) 422 in water at 60° C. is higher than 65% by weight.

EXAMPLE 2

600 cm³ of water and 92.2 g of cyanuric chloride are charged to a reactor of 2 liters of capacity equipped as in Example 1, but initially provided with a cooling bath.

While keeping the reaction mixture cooled at 2° C. by external cooling, 75.0 g of 2-methoxyethylamine in 100 cm³ of water is fed during a 2 hour time; during the addition, the temperature is allowed to gradually increase up to 5°–7° C.

The temperature is increased up to 20° C. and is kept at that value for 1 hour, then the reaction mixture is heated to 35°–40° C. and 40 g of sodium hydroxide is dissolved in 100 cm³ of water is added during approximately 3 hours.

The reaction mass is heated up to 60° C. and is kept at that temperature during 2 hours.

The reaction mixture is cooled down to room temperature and the resulting product is filtered off, with the filter cake being washed on the same filter, with water.

By oven-drying the filter cake at 100° C., 120.4 g of intermediate (VI):

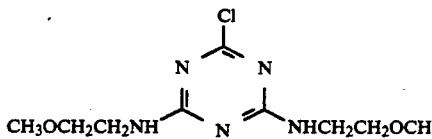
(VI)

are obtained as a white crystalline powder having m.p.=162° C.-164° C., and a chlorine content of 13.48% (theoretical value: 13.57%).

600 cm³ of water, 78.5 g of intermediate (VI) and 22.5 g of 2-methoxyethylamine are charged to the same reactor of 2 liters of capacity.

The reaction mass is heated up to boiling temperature and is kept refluxing for 2 hours, then, during about 3 hours, approximately 12 g of sodium hydroxide dissolved in 50 cm³ of water is added.

The reaction mixture is kept boiling for a further 2 hours, then is cooled down to room temperature.

The aqueous solution is treated with 3 portions, of 300 cm³ each, of methylene chloride.

The organic extracts are combined, thoroughly dried and submitted to distillation.

86.7 g of 2,4,6-tris-(2-methoxyethyl)-amino-1,3,5-triazine (VII):

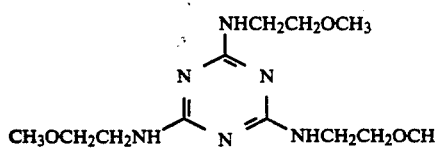
(VII)

are obtained as a very thick liquid product (m.p.=13° C.).

The structure of intermediates (VI) and (VII) was also confirmed by NMR analysis.

60 cm³ of water, 60 cm³ of methanol, 9.0 g of paraformaldehyde and, with stirring, 30.0 g of intermediate (VII) are charged to a reactor of 0.25 liters, equipped as the preceding one.

The reaction mass is heated at 60° C. for 10 minutes, until a solution is obtained.

The resulting solution, kept at 60° C., is fed, during a 20 minute time, to a suitably equipped steel reactor of 1 liter of capacity, containing a suspension constituted by 110 g of ammonium polyphosphate [Exolite(®) 422], 250 cm³ of water and 250 cm³ of methanol, heated at 65° C.

The reaction mixture is heated to 120° C., and is kept at that temperature for approximately 10 hours.

The reaction mixture is allowed to cool down to room temperature, and the resulting product is filtered, with the filter cake being washed on the filter with a water-methanol mixture.

Then, by proceeding according to the operating modalities as disclosed in Example 1, 141.1 g of a white crystalline product containing 24.0% of phosphorus, corresponding to a content of 76.4% of ammonium phosphate by weight, are obtained.

The resulting product corresponds to ammonium polyphosphate microencapsulated with resin in the ratio of 3.24:1 by weight.

The solubility of ammonium polyphosphate in water at 60° C. is of 5.6% by weight.

EXAMPLE 3

91 g of intermediate (IV), 240 cm³ of toluene and 110 g of morpholine are charged to the same reaction equipment of 1 liter of capacity as disclosed in Example 1.

The reaction mixture is heated to 65°-70° C. and is kept at that temperature for 2 hours; the reaction mixture is then heated up to boiling temperature and is kept refluxing for 1 hour.

The reaction mixture is allowed to cool down to room temperature, and then the resulting product is isolated by filtration. The filter cake is washed with plentiful water, and, after drying, 92 g of 2,4-diamino-6-morpholino-1,3,5-triazine (VIII):

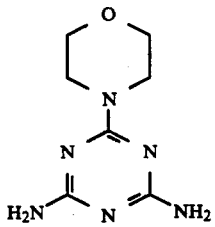
(VIII)

are obtained as a white crystalline powder with m.p.=248°-250° C.

The structure of intermediate (VIII) was confirmed by NMR analysis.

50 cm³ of methanol, 82 g of a solution at 37% by weight of formaldehyde and, with stirring, 19.6 g of intermediate (VIII) and 12.6 g of 2,4,6-triamino-1,3,5-triazine (melamine) are charged to the same reaction vessel of 0.25 liter of capacity of Example 1. The reaction mass is kept heated at 70° C. for 45 minutes, until a solution is obtained.

Such a solution, kept at 70° C., is fed, during a 30 minute time, to the same reaction vessel of 1 liter of capacity as previously used, containing a suspension constituted by 90 g of ammonium polyphosphate [Exolite(®)422], 220 cm³ of water and 220 cm³ of methanol, heated at 70° C.

The reaction mixture is heated up to boiling temperature and is kept under refluxing conditions for 8 hours.

Then, by proceeding according to the same operating modalities as disclosed in Example 1, 124.4 g of a white crystalline product containing 21.8% of phosphorus, corresponding to a content of 69.4% of ammonium polyphosphate by weight, are obtained.

The obtained product corresponds to ammonium polyphosphate microencapsulated with resin in the weight ratio of 2.27:1.

The solubility of ammonium polyphosphate in water at 60° C. is of 3.5% by weight.

EXAMPLE 4

49.0 g of intermediate (IV), 150 cm³ of water and 26.2 g of 2-methoxyethylamine are charged to a reactor of 0.25 liter of capacity, equipped as in Example 1.

The reaction mass is heated up to boiling temperature and is kept under refluxing conditions for 4 hours.

Subsequently, a solution constituted by 14 g of sodium hydroxide in 50 cm³ of water is added during a 20 minute time.

After a further stirring for 30 minutes, water distillation is started; the residual mass is subsequently treated with 3 portions, of 100 cm³ each, of acetonitrile, in order to extract the organic product.

By subsequently distilling off the solvent, 52.5 g of 2,4-diamino-6-(2-methoxyethyl)amino-1,3,5-triazine (IX):

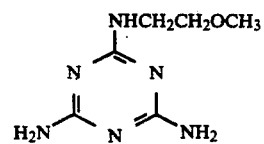
(IX)

are obtained as a white crystalline powder with m.p.=166° C.-169° C.

The structure of intermediate (IX) was confirmed by NMR analysis.

150 cm³ of water, 50 cm³ of methanol, 64.9 g of a solution at 37% by weight of formaldehyde and, with stirring, 36.8 g of intermediate (IX) rae charged to the same reaction equipment of 0.5 liter of capacity.

The reaction mass is heated up to 60° C. and is kept at this temperature during 30 minutes, until a solution is obtained.

The resulting solution, kept at 60° C., is fed, during a 1 hour time, to the same reaction equipment of 1 liter of capacity of the preceding examples, containing the suspension constituted by 90 g of ammonium polyphosphate [PhosCheck P/40(®) with a phosphorus content of 31.5%] and 200 cm³ of methanol, kept boiling.

The reaction mixture is refluxed for 10 hours, then is cooled down to room temperature.

The resulting product is filtered off and the filter cake is washed on the same filter, with a water-methanol mixture.

After filter cake drying and heat treatment, 127.1 g are obtained of a white crystalline product with a phosphorus content of 22.1%, corresponding to a content of 70.1% of ammonium polyphosphate by weight.

The obtained product corresponds hence to ammonium polyphosphate microencapsulated with resin in the ratio of 2.34:1 by weight.

The solubility of ammonium polyphosphate in water at 60° C. is of 5.5% by weight.

The solubility of PhosCheck P/40(®) in water at 60° C. is higher than 65% by weight.

EXAMPLES 5-12

By operating under analogous conditions to as disclosed in Examples from 1 to 4, the composites reported in following Table 2 are prepared.

and 0.33 g of pentaerythritol tetra[3-(3,5-di-tert-butyl-4-hydroxyphenyl)propionate] are blended and moulded on a MOORE platen press, by operating for 7 minutes at a pressure of 40 kg/cm².

Specimens are obtained as small slabs of approximately 3 mm of thickness, and on them the level of self-extinguishment is determined by measuring the oxygen index (L.O.I. according to ASTM D-2863/77) on a STANTON REDCROFT Instrument, and applying the "Vertical Burning Test", which makes it possible the material to be classified at the three levels 94 V-0, 94 V-1 and 94 V-2 according to UL 94 standards (published by "Underwriters Laboratories"—USA).

The following results are obtained:
L.O.I.=32.9
UL 94=Class V-0.

We claim:

1. A composite constituted by ammonium polyphosphate having the formula (I):

$$(NH_4)_{n+2}P_nO_{3n+1} \qquad (I)$$

wherein n is an integer in the range of from 2–800, microencapsulated with about 10–80% by weight of a resin obtained by polymerizing with aldehydes a mixture comprising:
(a) from 0 to 50 parts by weight of one or more polyaminic derivatives; and
(b) from 50 to 100 parts by weight of one or more derivatives of 2,4,6-triamino-1,3,5-triazine having the formula (II):

TABLE 2

| EXAMPLE No | APP (*) | Derivative with general formula (I) R—N—R₁ | R₂ | R₃ | Parts by weight | Polyaminic derivative Designation | Parts by weight | Molar ratio amines/formaldehyde | Molar ratio APP/resin | Solubility of APP at 60° C. g/100 g of water |
|---|---|---|---|---|---|---|---|---|---|---|
| 5 | a | N⌒N—CH₃ (piperazine ring) | H | H | 70 | Melamine | 30 | 1:4.0 | 2.14:1 | 6.1 |
| 6 | a | CH₂CH₂OH | H | H | H | 80 | Ethyleneurea | 20 | 1:2.7 | 1.82:1 | 6.8 |
| 7 | b | (CH₂)₂OCH=CH₂ | H | H | H | 100 | — | | 1:4.5 | 2.2:1 | 5.1 |
| 8 | a | (CH₂)₂OH | (CH₂)₂OH | H | H | 65 | Melamine | 35 | 1:3.5 | 2.8:1 | 3.9 |
| 9 | a | (CH₂)₃N⌒O (morpholine ring) | H | H | H | 100 | — | | 1:3.8 | 2.35:1 | 4.8 |
| 10 | b | CH₂CH₂OH | H | H | H | 100 | — | | 1:5.0 | 4.9:1 | 4.4 |
| 11 | a | CH₂CH₂OH | H | CH₂CH₂OH | H | 100 | — | | 1:4.5 | 2.6:1 | 9.1 |
| 12 | b | N⌒O (morpholine ring) | | CH₂CH₂OH | H | 62 | Melamine | 38 | 1:2.7 | 2.84:1 | 4.6 |

(*) a - Exolit 422 ®
b - Phos-Check P/40 ®

EXAMPLE 13

75.0 g of isotactic polypropylene flakes, having a Melt Flow Index equal to 12 and containing 96% by weight of a fraction insoluble in n-heptane; 24.0 g of the product of Example 1; 0.67 g of dilaurylthiopropionate wherein at least one of radicals R, $R_1$, $R_2$ and $R_3$ is:

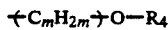

or

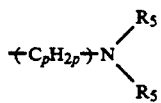

wherein:
m is an integer within range of from about 2 to 8;
p is an integer within the range of from 2 to 6;
$R_4$ is H, $C_1$–$C_8$ alkyl, $C_2$–$C_6$ alkenyl, $+C_qH_{2q}+O$—$R_6$ wherein q is an integer within the range of from about 1 to 4 and $R_6$ is H, $C_1$–$C_4$ alkyl, $C_6$–$C_{12}$ cycloalkyl or alkylcycloalkyl;
the radicals $R_5$, which are the same or different from each other, are:
H, $C_1$–$C_5$ alkyl; $C_2$–$C_6$ alkenyl; $C_6$–$C_{12}$ cycloalkyl or alkylcycloalkyl; $C_1$–$C_4$ hydroxyalkyl; or the moiety;

is selected from the group consisting of aziridine, pyrrolidine, piperidine, morpholine, thiomorpholine, piperazine, 4-methylpiperazine and 4-ethylpiperazine radicals, or in the formula (II), the moiety:

is selected from the group consisting of aziridine, pyrrolidine, piperidine, morpholine, thiomorpholine; piperazine; 4-methylpiperazine, 4-ethylpiperazine; 2-methylpiperazine; 2,5-dimethylpiperazine; 2,3,5,6-tetramethylpiperazine; 2,2,5,5-tetramethylpiperazine; 2-ethylpiperazine and 2,5-diethylpiperazine radicals; the other radicals R, $R_1$, $R_2$ and $R_3$, which are the same or different from each other, have the same meaning as defined above, or they each are:
H, $C_1$–$C_{18}$ alkyl, $C_2$–$C_8$ alkenyl, $C_6$–$C_{16}$ cycloalkyl or alkylcycloalkyl, which are unsubstituted or substituted with hydroxy or $C_1$–$C_4$ hydroxyalkyl.

2. Process for preparing the composite constituted by microencapsulated ammonium polyphosphate according to any of claims from 1 to 7, comprising:
(i) reacting, in solution, the triazinic derivative having the general formula (II), either mixed or not mixed with the polyaminic derivative, with aldehydes;
(ii) causing the resulting reaction product to turn into a resin form, by adding the solution (i) to a dispersion of ammonium polyphosphate having the general formula (I), having a pH value comprised within the range of from 1 to 5.

3. Process according to claim 2, in which the reaction (i) is carried out with a molar ratio of triazinic derivative having general formula (II), or its mixture with said polyaminic derivative, to the aldehydes, comprised within the range of from 1:1 to 1:6.

4. Process according to claims 2 or 3, in which the reaction (i) is carried out at temperatures comprises within the range of from 20° C. to the boiling point of the solvent used, and the reaction (ii), of resinification and microencapsulation, is carried out at a temperature comprised within the range of from 40° C. to 150° C.

5. Process according to claims 2, 3 or 4, in which the reactions of steps (i) and (ii) are carried out in one single step at a temperature higher than 40° C.

6. The composite according to claim 1, wherein the polyaminic derivative is selected from the group consisting of urea; ethyleneurea, thiourea, ethylenethiourea, propylene urea, melamine, acetoguanamine, propionguanamine, butyroguanamine, isobutyroguanamine, caprinoguanamine, succinoguanamine, benzoguanamine, metamethylbenzoguanamine, benzylguanamine, hydantoin, piperazine-2,5-dione, and barbituric acid.

7. The composite according to claim 1, wherein the aldehyde is formaldehyde or a mixture containing formaldehyde and up to 20% by mole of another aldehyde of the formula (III):

$R_7$—CHO wherein $R_7$ is $C_1$–$C_8$ alkyl, $C_2$–$C_6$ alkenyl, $C_6$–$C_{12}$ cycloalkyl or $C_6$–$C_{12}$ aryl.

8. The composite according to claim 7, wherein the aldehyde is formaldehyde.

9. The composite according to claim 1, wherein each of said radicals R, $R_1$, $R_2$ and $R_3$, which are the same or different from each other, are selected from the group consisting of methyl, ethyl, propyl, isopropyl, n-butyl, isobutyl, tert-butyl; n-pentyl; isopentyl; n-hexyl; tert-hexyl; octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylemino)ethyl; 3-(N,N-dimethylamino)propyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 5-(N,N-diethylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)ethyl; 2-(N-ethenylamino)ethyl; 2-(N-cyclohexylamino)ethyl; 2-(2-hydroxyethylamino)ethyl; 2-(2-hydroxyethoxy)ethyl; 2-(2-methoxyethoxy)ethyl; and 6-(N-propylamino)hexyl.

10. The composite according to claim 2, wherein $R_7$ is selected from the group consisting of methyl, ethyl, n-propyl, n-butyl, n-hexyl, n-octyl, ethenyl, propenyl, cyclohexyl and phenyl.

11. The composite according to claim 1, wherein said ammonium polyphosphate and said resin are present in said composite in a range of molar ratios of from about 1.82:1 to about 4.9:1, respectively.

12. The composite according to claim 1, wherein said ammonium polyphosphate therein has a solubility in water at 60° C. from about 3.9 to about 9.1 g/100 g of water.

* * * * *